United States Patent [19]

Dittell

[11] 4,382,368

[45] May 10, 1983

[54] GEOTHERMAL HOT WATER SYSTEM

[76] Inventor: Edward W. Dittell, 184 NE. 71st Way, Minneapolis, Minn. 55432

[21] Appl. No.: 246,005

[22] Filed: Mar. 20, 1981

[51] Int. Cl.³ ............................................. F25B 27/02
[52] U.S. Cl. .................................................. 62/238.6
[58] Field of Search ....................................... 62/238.6

[56] References Cited

U.S. PATENT DOCUMENTS 3,916,638 11/1975 Schmidt .............................. 62/238.6
4,241,588 12/1980 Murphy et al. ..................... 62/238.6

*Primary Examiner*—Lloyd L. King
*Attorney, Agent, or Firm*—Hugh D. Jaeger

[57] ABSTRACT

Geothermal hot water system including a hot water tank and a warm water tank which are heated independently of each other by a close loop freon system. The closed loop freon system includes a main condenser which heats water for the warm water tank and a super-heated condenser which heats water for the hot water tank, and where the freon passes through a water evaporator which is heated by water such as from a well or other suitable source. The water evaporator in the closed loop freon system passes the water through but no environmental change to the water. An electrical circuit including aquastats in the warm water tank connected therethrough controls operation of the closed loop freon system including respective pumps on the super-heated condenser and main condenser for pumping water. Pumps pump water through the main condenser for the warm tank and through the super-heated condenser for the hot tank. The system provides for energy conservation in that the head pressure of the compressor is kept in the lower operating ranges as determined by the discharge flow of the main condenser which varies by the head pressure and temperature flow control which varies by temperature. The geothermal hot water system uses a least amount of energy in heating the water in the hot tank as well as the warm tank.

7 Claims, 2 Drawing Figures

GEOTHERMAL HOT WATER SYSTEM

BACKGROUND OF THE INVENTION

1. Field of the Invention

Present invention pertains to a hot water system, and, more particularly, pertaining to a geothermal hot water system being energy efficient.

2. Description of Prior Art

The prior art hot water systems usually have consisted of either gas, electric or other fuel fired systems which heat up a large quantity of water and maintain a quantity of water at a predetermined temperature. This is an inefficient use of today's expensive fuels based on the fact of maintaining such a large quantity of water at a predetermined temperature when the uses of such water may be very minimal.

Other types of hot water systems now being utilized are solar derivative, but are dependent upon the sun shining and are not practical for continuous use.

Geothermal systems have been experimented with but are not practical due to the prior art operation of maintaining a high head pressure on the compressor to continuously maintain a tank of water at a predetermined temperature. Maintaining the tank of water at predetermined temperature required bringing the tank up close to temperature and the last few degrees of temperature required that the compressors would maintain a high head pressure providing for mechanical failure of the system along with excessive amounts of electric energy or mechanical energy to drive the compressor.

The present invention overcomes the disadvantages of the prior art by providing a geothermal hot water system including two water tanks, one hot and one warm independent of each other, in combination with a closed loop condensing system, the compressor in the condensing system maintains a low head pressure thereby using least energy and providing for prolonged life of operational components.

SUMMARY OF THE INVENTION

The general purpose of the present invention is to provide a geothermal hot water system which provides the heat necessary by extracting heat from a water main such as well water which is subsequently discharged with no environmental change and is carried to the water to be heated by condensing liquid such as freon. The system provides for least energy consumption and maximum efficiency by maintaining a low condenser head pressure thereby requiring a least use of energy to drive the condenser.

According to one embodiment of the present invention, there is provided a geothermal hot water system including a closed loop condensing system having a super-heated condenser, a main condenser, and a water evaporator, the water evaporator coupled to a source of water such as well water, an open loop water system including a warm water tank having aquastats, the water flowing through a main condenser heat exchanger controlled by a pump and a discharge flow valve regulated by the head pressure of a compressor of the closed loop condensing system, a hot water tank connected to a super-heated condenser having a pump and a temperature flow valve, and an outlet connected to the hot water tank for discharging hot water whereby water flows into the system through the main condenser, the warm water tank, super-heated condenser, the hot water tank and is discharged at the outlet in which the water is heated by the main condenser and the super-heated condenser in the closed loop condensing system where the compressor provides for the condensing liquid to take on heat from water from a water main which passes through the water evaporator maintaining the same environmental conditions, thereby providing geothermal heating system which has a condensing system operating at low pressures, providing for least utilization of energy and powering the condensant system and maximum heat transfer of the hot water and warm water tanks which operate independently of each other.

Electrical circuit is provided which connects to the aquastats in the warm water tank and provides for electrical operation of the condensing system. The operational parameters of the electrical circuit are determined by the predetermined temperatures of the aquastats of the warm water tank. An aquastat can also be provided in the hot water tank.

A significant aspect and feature of the present invention is a geothermal hot water heating system which includes two tanks, a hot water tank and a warm water tank which operate independently of each other and which have water heated by independent condensers providing for low compressor head pressure. Either or both of the tanks can be provided with aquastats for predetermined temperature control.

Another significant aspect and feature of the present invention is a geothermal hot water heater which heats the water in the tank where the warm water tank is heated by the main condenser and the hot water tank is heated by a super-heated condenser. The two condensers are in series in the closed loop condensing system.

Another significant aspect and feature of the present invention is a geothermal hot water heating system where the closed loop condensing system includes a water evaporator for heating of the condensant by water from such a source as a well. Water evaporator is closed and not environmentally altering the condition of the water in that the water is returned to its source and environmentally unchanged.

A further significant aspect and feature of the present invention is a geothermal hot water system which maintains a low head pressure on the compressor of the condensing system providing for least consumption of energy and prolonged life of condensing components.

Having thus described the invention, it is a principal object hereof to provide a geothermal hot water heating system. The system includes two water tanks and is energy efficient.

An object of the present invention is to provide a geothermal hot water heating system which is energy efficient.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF PREFERRED EMBODIMENTS

Figure 1:
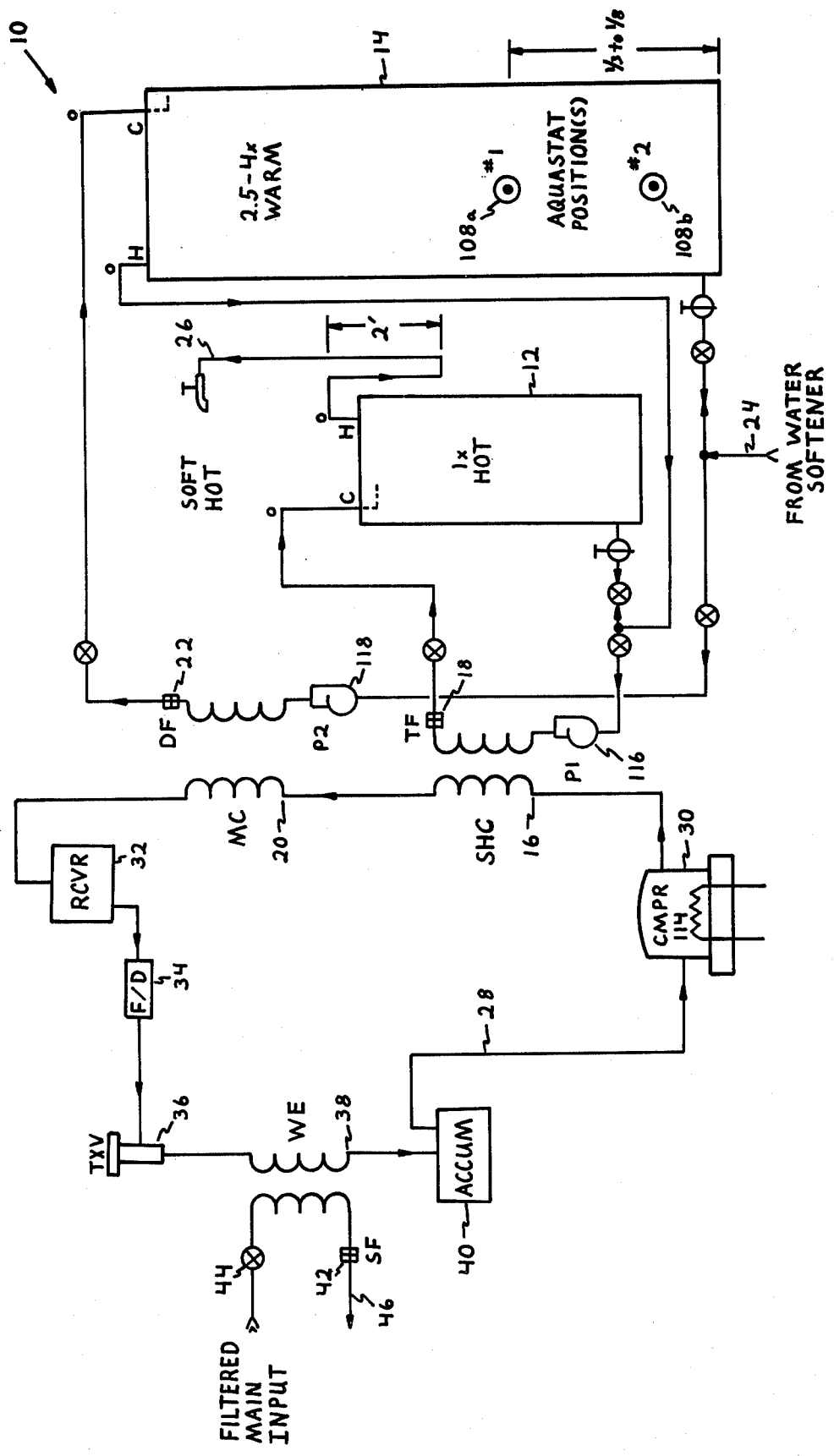
FIG. 1 illustrates a diagrammatic view of a geothermal water heating system; and, FIG. 2 illustrates an electrical circuit schematic for a circuit control of the geothermal hot water system of FIG. 1.
Figure 2:
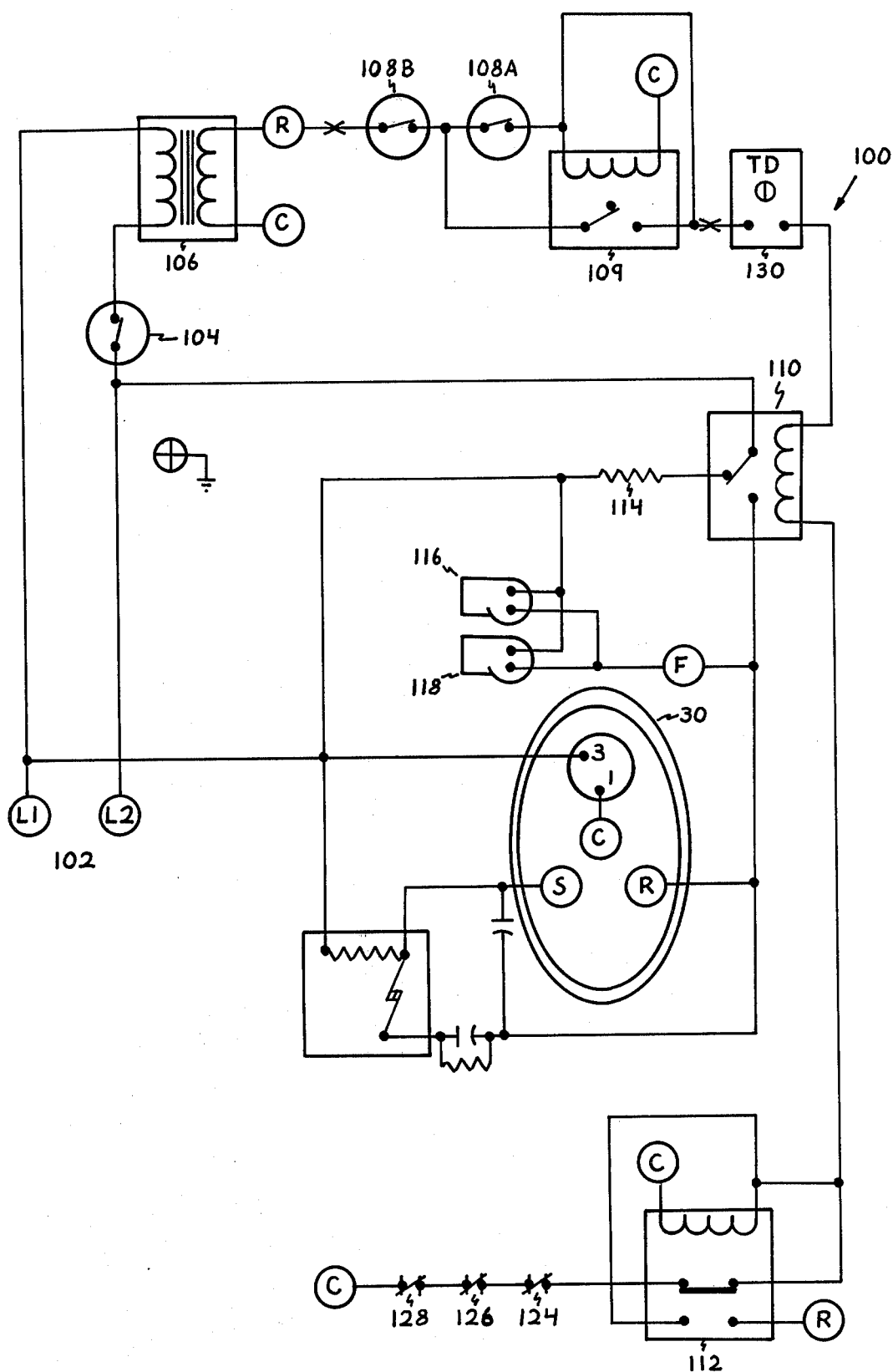

FIG. 1, which discloses a flow system of the geothermal water heater, the present invention, shows the geothermal water heater 10 including a hot water tank 12 and a warm water tank 14, the size of the warm water tank being 2.5 to 4 times the capacity of the hot water tank 12. The tanks are interconnected with appropriate piping which is valved by either gate valves or ball valves, and provided with drains and vent ells for filling and draining as is appropriate as illustrated in the figure. The vent ells and drains also provide for purging of air as required in filling of the system. A super-heat condenser 16 is piped to the hot tank 12 through a temperature flow control 18 which varies the flow of the water to maintain an output temperature substantially in the range of 115°-150° by way of example and for purposes of illustration only as pumped through by circulation pump 116 and as is controlled by the circuit diagram of FIG. 2 as later described in detail. The super-heat condenser 16 and also the main condenser 20 are coaxial counterflow condensers, also known as heat exchangers, which operate in conjunction with the closed loop freon system 28 later described in detail. The main condenser 20, substantially three times the capacity of the super-heat condenser 16, couples to the warm tank 14 through a discharge flow valve 22 controlled by the heat pressure of the compressor 30 to maintain a head pressure substantially in the range of 230-280 psi for R-22 freon as used in the system 28 by way of example and for purposes of illustration only and is not to be construed as limiting of the present invention. Water is pumped throught the condensor by pump 118 as illustrated in FIG. 2. Warm water tank 14 is provided with aquastats 108a and 108b. The hot water tank 12 can also be provided with aquastats in an alternative feature. Soft water is introduced into the system at 24 and hot water is discharged from the system at 26. The closed loop freon system 28 includes the super-heated condenser 16, the main condenser 20, a receiver 32, a filter-dryer 34, a thermo expansion valve 36, a water evaporator 38, a suction accumulator 40, and the compressor 30 having a crankcase heater 114 all connected in a series closed loop system relationship. The water evaporator 38 includes a filtered main input incoming flow 44, outgoing flow 46, a suction flow valve 42 controlled by the suction pressure of the compressor 30. The filtered main water can come from a well and be discharged back into the well as the water only flows through the water evaporator and is not chemically or physically altered in any way but temp. providing for pure environmental consideration.

FIG. 2 illustrates electrical circuit schematic 100 for the geothermal water heater 10 of the present invention and of FIG. 1, and includes connections 102 to an AC source of power for either American or European current. A reset off/on switch 104 and a predetermined step-down transformer 106 of the selected voltage are connected in series. Aquastat sensors 108a and 108b connect in series through a low-voltage relay 109. An optional time delay relay 130 set at a predetermined time limit such as in the range of 10-60 seconds connects between the relay 109 and the compressor contacter 110. A lockout relay 112 connects to the other side of the compressor contacter 110 and locks out the compressor 30 if the high head or low suction pressures fall below predetermined limits as set on the high head pressure sensor 124, the low suction sensor 126, and the low water pressure sensor 128, all of the sensors being connected in series and connected to the lockout relay 112. The sensors are connected to break on full trip relays connected to the lockout relay 112 to disable the compressor on sensing one of the predetermined conditions preventing damage to the compressor or associated components of the geothermal water heater 10. If such were to occur, the reset switch 104 would be required to be actuated before the compressor 30 could be started. A crankcase heater 114 connects to the compressor contacter 110. Pump 116 for the super-heated condenser and pump 118 for the main condenser are also actuated by the compressor contacter 110.

PREFERRED MODE OF OPERATION

The geothermal water heater system 10 is initially pressurized at the water inlet 24 and purged of air and at the main inlet 44 so that the system is charged with water at a predetermined operational pressure. Aquastats 108a and 108b upon sensing water of a lower than a predetermined temperature activate the compressor 30 through the optional time delay relay 130 and the compressor contacter 110. The water in the tanks, the hot tank 12 and the warm tank 14, are effectively heated from the top down with the pumps drawing the water out of the bottom of the respective tanks and putting it back in the top. The pumps 116 and 118 draw the water out of the tanks 12 and 14 respectively and place the heater water back in through the top of the tanks 12 and 14.

Water is restricted in the flow through the super-heated condensor 16 by temperature flow control valve 18 until the water temperature through the valve reaches the predetermined temperature of the hot water in the system 10. The temperature is sensed by a sensing bulb on the valve 18 in accordance with the operation of temperature actuated water valves. As the temperature of the water in the hot water tank increases, the efficiency of the super-heated condenser 16 decreases. The energy required for cooling the compressor is assumed by the main condenser 20. At this particular point in operation, the head pressure of the compressor 30 rises and the head pressure actuated flow valve 22 opens thereby cooling the main condenser and further heating the water in the warm tank 14 to a predetermined temperature where the system automatically shuts itself down when the bottom aquastat 108b reaches a predetermined temperature.

The closed loop freon system 28 is indicative in operation with the exception of the water evaporator 38 which operates from the main inputs 44 which could be a deep well in the ground or other cold source of filtered water where the freon in the system extracts heat from the main water input which is subsequently discharged out through the main water output 46 through the suction flow valve 42. The suction control flow valve 42 is set according to predetermined operating parameters of the system including the suction pressure of the compressor 30, the predetermined incoming water temperature and the predetermined outgoing water temperature. The system overall provides a wide range of operating parameters depending upon the volume of the system and the specific components selected according to the teachings of the disclosure of the specification.

The two water tanks, the hot water tank 12 and the warm water tank 14, provide an independent system where the tanks operate independently of each other and provide for low head pressures on the compressor 30. The two independently controlled tanks 12 and 14 through the respective heat exchangers 16 and 20 provide for the hot water tank temperature to be a relatively high temperature with regard to the temperature of the warm water tank and further providing for protection of the compressor 30 and combined energy conservation of the compressor 30 in that the warm tank 14 provides for lower condensing temperatures, lower head pressures and overall system operation due to the fact that the main condenser in combination with the warm tank allows for lower condensing temperatures and lower head pressures. The hot water tank 12 operates independently of the warm water tank 14 in that the hot water tank 12 operates with the super-heated condenser 16 and when efficiency drops, the warm water tank 14 operates in conjunction with the main condenser 20 controlled by the head pressure of the compressor 30. Most importantly, this provides for least energy consumption and maximum energy conservation through the compressor 30 in the closed loop freon system 28. This further leads to an extended life on the compressor 30 and other related components in the heat exchanging system.

Various modifications can be made to the present invention without departing from the apparent scope thereof. While R-22 can be used in the closed loop freon system, any other suitable condensent can be utilized without departing from the teachings of this patent. Pressure ranges and tank sizes are set forth by way of example and for purposes of illustration only. The circuit schematic of FIG. 2 is one disclosure of controlling the system of FIG. 1, and other circuits are within the teachings of this patent.

Having thus described the invention, what is claimed is:

1. Geothermal hot water system comprising:
    a. means providing for a closed loop compression system including evaporator means for heating of condensing gases of said closed loop system and a plurality of condensers serially connected in said system to condense said gases, super heated condenser connected to one side of said closed loop system and main condenser serially connected to said super heated condenser in same side of said system;
    b. means for storing plurality of quantities of water at predetermined temperatures, said plurality of storage means connected to said plurality of condensers respectively, and said storage means connected in a serial relationship, said storing means including a serially connected warm water tank in a first open loop system and a hot water tank in a second open loop system, both of said open systems for warm and hot water; and,
    c. means for pumping water about said closed loop system to said evaporator means for thermal exchange in said compression system means and means distributing water in said open loop ground water system to said storage means whereby heat is provided from said closed loop system through said compression system means to said storage system means through said condensers thereby providing heat to water in said storage system means with least consumption of energy by said closed loop compression system and whereby serial connection of said super heated condensor and said main condensor provides for heating of said open loop water systems.

2. System of claim 1 wherein said warm water tank couples to said main condensor.

3. System of claim 1 wherein said hot water tank couples to said super heated condensor.

4. System of claim 1 comprising at least one aquastat in said warm water tank.

5. System of claim 4 comprising positioning of said aquastat in a lower third to eighth volume of said warm water tank.

6. System of claim 1 wherein said closed loop compression system includes a compressor having a head pressure in the range of 230–280 psi for R-22.

7. System of claim 1 wherein said open loop water systems are first and second closed loop systems.

* * * * *